Figures 1, 2:
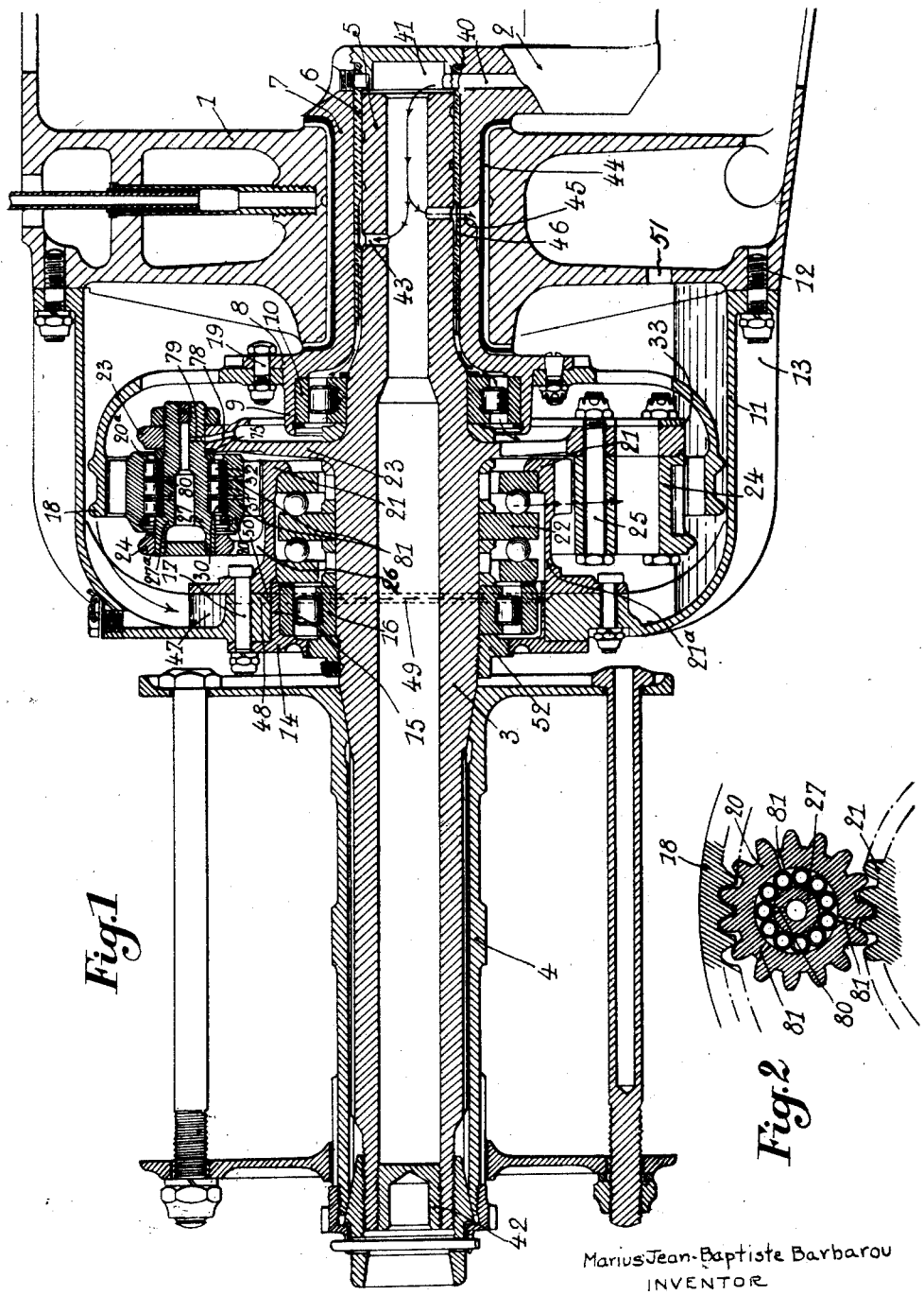

Feb. 19, 1929. 1,702,244

M. J. B. BARBAROU

SPEED REDUCING GEAR

Filed April 15, 1927

Marius Jean-Baptiste Barbarou
INVENTOR

By Otto Munk
his ATT'Y.

Patented Feb. 19, 1929.

1,702,244

UNITED STATES PATENT OFFICE.

MARIUS JEAN-BAPTISTE BARBAROU, OF PARIS, FRANCE.

SPEED-REDUCING GEAR.

Application filed April 15, 1927, Serial No. 184,018, and in France July 8, 1926.

The present invention relates to improvements in speed reducing gears, and more particularly to reducing gears of the epicycloidal type comprising sun wheels with spur gearing.

One of the improvements, the object of the invention consists in the mounting of the planetary pinions upon the driven shaft, by which I reduce the size or bulk of the arrangement to a minimum and obviate all axial displacement of the planetary pinions.

A further improvement consists in the lubricating arrangement which provides for the most efficient lubrication of said planetary pinions.

In the appended drawing which shows, by way of example, an embodiment of the invention:

Fig. 1 is an axial section of the speed reducing device according to the invention, which is herein applied to the propeller of an aeroplane, and Fig. 2 is a partial transverse section at a larger scale of a planetary pinion.

In the appended drawing, 1 is the crankcase of the engine, 2 the crankshaft and 3 a driven shaft, which is herein supposed to be a propeller shaft. The hub 4 of the propeller is mounted upon the shaft 3 in any suitable manner, known per se.

The inner end 5 of the shaft 4 is journalled in the recessed end 7 of the said crankshaft, with the interposition of an anti-friction bearing bush 6.

The end 7 of the crankshaft is enlarged at 8 and comprises a cup-shaped portion 9 receiving a roller bearing 10 which serves to reduce the wear of the bearing bush 6. To the crankcase 1 is secured the casing 11 of the speed-reducing gear, by means of the stud bolts 12. Ribs 13 are provided in order to increase the strength of the said casing.

To the casing 11 is secured by means of the bolts 17 a member 14 forming a cup 15 in which is disposed a roller bearing 16.

The speed-reducing device comprises an internally toothed annulus 18 which is secured to the enlarged part of the crankshaft by means of bolts 19. The annulus 18 meshes with the planetary pinions 20 which are also in gear engagement with the stationary externally toothed sun wheel 21. The wheel 21 is secured to the casing of the speed-reducing device by the bolts 17, and its hub forms a socket 21ª in which is disposed a thrust bearing 22 adapted to absorb the axial thrusts to which the shaft 3 is subjected, due to the traction or the thrust of the propeller.

The planetary pinions 20 are constituted by small pinions journalled upon shafts 27 mounted between a disc 23 formed at the periphery of the shaft 3 or keyed thereto, and, a ring 24 which is connected to the disc 23 by means of bolts 25. The said ring is recessed at 26 for the insertion of the planetary pinions 20, which may be, for instance, three in number. According to the invention, the shafts 27 are made hollow and constitute the inner races for adjacent rows of rollers 30, 31, 32; the outer races for said rollers are constituted by the planetary pinions 20 themselves.

In order to prevent any transverse displacement of the planetary pinion, the shaft 27 is provided with a shoulder or projection 27ª upon which the rollers are pressed, by means of a ring 75; similarly, the planetary pinion has an inwardly projecting shoulder 20ª and a ring 76, held in place by an elastic split ring 77, whereby the ring 76 and hence the planetary pinion may be readily removed.

The speed reducing device is lubricated in the following manner. The oil under pressure is delivered through a conduit 40, formed in the crankshaft, to a chamber 41 which is constituted by the end portion of the recess 7 in the crankshaft. The shaft 3 is hollow throughout its entire length and the end is closed by a plug 42. The oil fills the duct in the shaft 3 and escapes through the small conduits 43, so as to lubricate the bearing 6. The bearing 44 of the crankshaft is lubricated by the continuous flow, through a conduit 45, of the oil contained in a chamber 46. The oil which served to lubricate the bearing 6 also lubricates the roller bearing 10 and is then projected by centrifugal force against the walls of the casing 11. A part of this oil collects by gravity at the bottom of the casing 11. The oil which has served to lubricate the bearing 44 will also drop into the casing 11.

The gearing which comprises the sun wheel 18 and the planetary pinions 20 is lubricated by splashing in the oil contained in the bottom of the casing.

For the lubrication of the bearing 16 and of the gearing formed by sun wheel 21 and planetary pinions 20, the casing 11 and the hub 21ª of the wheel 21 are shaped so as to form a sort of trough 47 at the upper part of said casing. Said trough contains a part of the oil which is projected by centrifugal force upon the walls of the casing 11. This oil flows down through a duct 48 into a circular channel 49 which is limited by a bevelled part 50 of the casing 11, by the hub 21ª of the wheel 21 and by the cup 15. This oil will then lubricate the bearing 16 and the thrust bearing 22, is collected in lower part of the wheel 21, and flows at the bottom of the casing through suitable holes 51, lubricating while on the way the teeth of the wheel 21 and the planetary pinions 20.

To obviate all leakage of oil towards the propeller, a fluidtight packing 52 is mounted on the shaft 3; said packing consists of a ring which is internally screw-threaded so as to be screwed upon the shaft; said ring is also threaded externally in a direction such that any oil which tends to enter the sunken part of the thread will be constantly brought to the interior of the casing by the rotation of the shaft.

The lubrication of the planetary pinions is provided by the combined action of the oil flowing outwardly from the central opening through radial ducts 80 and the oil flowing inwardly through ducts 81, under the centrifugal effect. The oil may be delivered to the central opening through radial ducts 78, 79.

The ducts 80 will also serve, when in the proper direction, during the rotation, to deliver oil to the meshing teeth of the gear. The whole lubrication will thus increase with the velocity of the rotation.

Obviously, the said invention is not strictly limited to the constructional forms which are herein described, and these are susceptible of numerous modifications in detail without departing from the spirit of the invention.

Having now described my invention, what I claim as new and desire to secure by Letters Patent is:

1. Means for mounting the planetary pinions of epicycloidal speed reducing gears upon their rotary support comprising, a ring connected to said rotary support, said pinions being located in recesses of said ring and, for each planetary pinion, a shaft secured to said rotary support and to said ring, a number of adjacent rows of rollers directly engaging said shaft and the inner surface of an axial bore provided through said pinion, and means for maintaining the middle plane of said pinion substantially in coincidence with the common middle plane of the stationary sun wheel and the rotary annulus of said speed reducing gear.

2. Means for mounting the planetary pinions of epicycloidal speed reducing gears as claimed in claim 1, wherein a screwthreaded portion of reduced diameter at the end of said shaft extends through said rotary support, a nut being screwed upon the screwthreaded end of said shaft protruding from said rotary support, a spacing ring being interposed between the portion of greater diameter of said shaft and the adjacent face of said rotary support, said rollers engaging a shoulder of said shaft formed adjacent the opposite end thereof.

In testimony whereof I have signed my name to this specification.

MARIUS JEAN-BAPTISTE BARBAROU.